United States Patent [19]

Martin et al.

[11] Patent Number: 5,399,261
[45] Date of Patent: Mar. 21, 1995

[54] INSTALLATION FOR THE TREATMENT OF FLOWS OF LIQUIDS WITH MONOPHASE CONTACTOR AND RECIRCULATING-DEGASSING DEVICE

[75] Inventors: Nathalie Martin, Paris; Michel Faivre, Acheres; Marie-Marguerite Bourbigot, Garches, all of France

[73] Assignee: Gie Anjou-Recherche, Paris, France

[21] Appl. No.: 703,799

[22] Filed: May 21, 1991

[30] Foreign Application Priority Data

May 31, 1990 [FR] France .................. 90 06969

[51] Int. Cl.$^6$ .................................................. C02F 1/78
[52] U.S. Cl. ................. 210/195.1; 210/199; 210/205; 210/218; 210/220; 261/36.1; 261/93; 261/DIG. 42
[58] Field of Search ............. 210/195.1, 299, 205, 210/220, 221.1, 221.2, 96.1, 143, 256, 218; 261/36.1, 93, DIG. 42, DIG. 75; 366/102–104

[56] References Cited

U.S. PATENT DOCUMENTS

| | | | |
|---|---|---|---|
| 1,312,754 | 8/1919 | Rowand | 209/169 |
| 1,342,115 | 6/1920 | Janney | 209/169 |
| 1,402,099 | 1/1922 | Shimmin et al. | 209/169 |
| 1,434,232 | 10/1922 | Sherwood | 209/169 |
| 2,530,814 | 11/1950 | Becze et al. | 261/93 |
| 2,684,233 | 7/1954 | Payne | 261/93 |
| 3,092,678 | 6/1963 | Braun | 261/30 |
| 3,572,661 | 3/1971 | Muller et al. | 261/86 |
| 3,605,975 | 9/1971 | Brimhall | 209/169 |
| 3,625,834 | 12/1971 | Muller et al. | 261/93 |
| 3,643,403 | 2/1972 | Speece | 261/93 |
| 3,827,679 | 8/1974 | Kaelin | 261/91 |
| 3,865,721 | 2/1975 | Kaelin | 261/93 |
| 3,945,918 | 3/1976 | Kirk | 210/255 |
| 3,972,815 | 8/1976 | O'Cheskey et al. | 209/169 |
| 4,072,613 | 2/1978 | Alig | 210/198.1 |
| 4,197,200 | 4/1980 | Alig | 210/104 |
| 4,378,436 | 3/1983 | Heine et al. | 435/243 |
| 4,454,077 | 6/1984 | Litz | 261/91 |
| 4,519,959 | 5/1985 | Takeuchi et al. | 261/93 |
| 4,564,457 | 1/1986 | Cairo et al. | 210/221.2 |
| 4,699,740 | 10/1987 | Bollenrath | 261/93 |
| 4,750,994 | 6/1988 | Schneider | 209/170 |
| 4,784,775 | 11/1988 | Hardison | 210/763 |
| 4,919,849 | 4/1990 | Litz et al. | 261/87 |
| 4,956,080 | 9/1990 | Josefik | 210/195.1 |
| 5,009,816 | 4/1991 | Weise et al. | 261/21 |
| 5,108,662 | 4/1992 | Litz et al. | 261/16 |

FOREIGN PATENT DOCUMENTS

| | | |
|---|---|---|
| 1139463 | 1/1983 | Canada . |
| 0264905 | 10/1987 | European Pat. Off. . |
| 1062139 | 4/1954 | France . |
| 2247426 | 5/1975 | France . |
| 2558818 | 8/1985 | France . |
| 2614016 | 10/1988 | France . |
| 2045603 | 4/1971 | Germany . |
| 15706 | 5/1978 | Japan . |
| 54-63457 | 5/1979 | Japan . |
| 61-53119 | 11/1986 | Japan .................. 210/205 |
| 1-130796 | 11/1987 | Japan . |
| 1221022 | 2/1971 | United Kingdom . |
| 2033772 | 10/1979 | United Kingdom . |

Primary Examiner—Peter A. Hruskoci
Attorney, Agent, or Firm—Merchant, Gould, Smith, Edell, Welter & Schmidt

[57] ABSTRACT

An installation for the treatment of a flow of liquids, notably potable water or effluents, installation of the type wherein the liquids are put into contact with a treatment gas during a pre-determined treatment period, the installation comprising means for the addition of the treatment gas to the flow of liquids so as to form a homogeneous two-phase treatment medium, means for the forced dissolution of the treatment gas in the flow of liquids to be treated cooperating with means for the degassing of the two-phase treatment medium so as to produce a monophase treatment medium and contactor means providing for a plug flow of the degassed monophase treatment medium during the pre-determined treatment period. A particular exemplary application of the installation is to the ozonation of liquids.

7 Claims, 3 Drawing Sheets

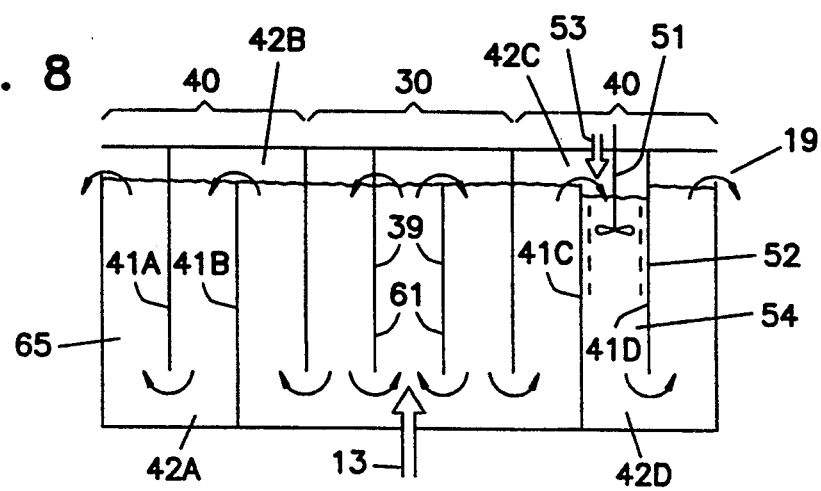
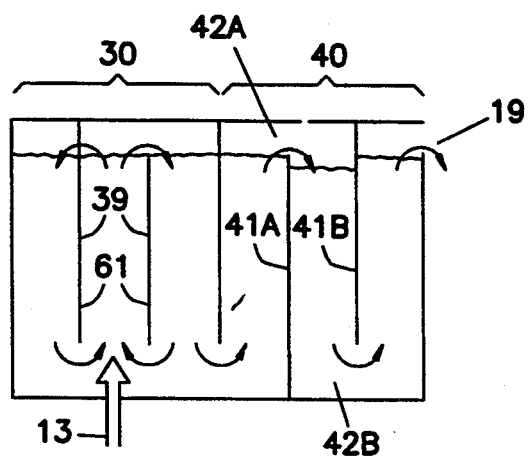
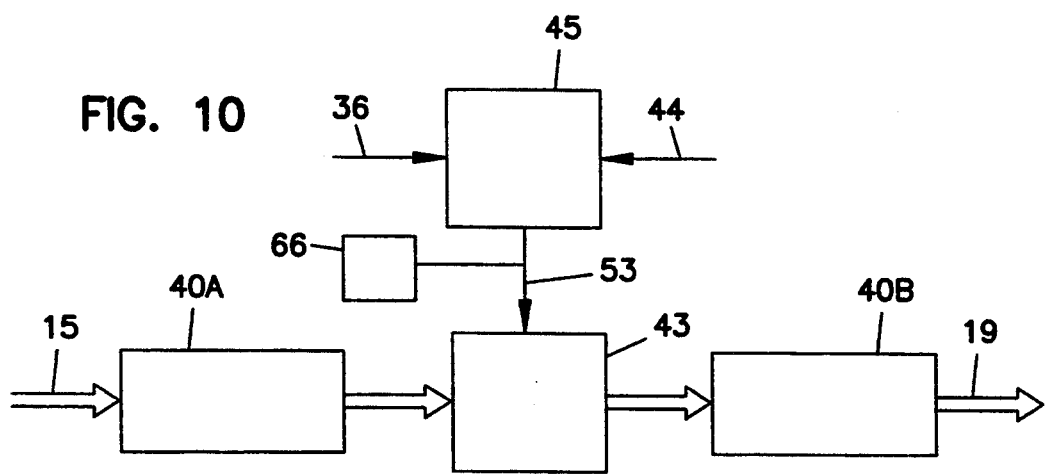

INSTALLATION FOR THE TREATMENT OF FLOWS OF LIQUIDS WITH MONOPHASE CONTACTOR AND RECIRCULATING-DEGASSING DEVICE

BACKGROUND OF THE INVENTION

1. Field of the Invention

The field of the invention is that of the treatment of liquids. More precisely, the invention relates to the putting of liquids and, notably, potable water or effluents, into contact with a treatment gas. A particular example of the application of the invention is the ozonation of liquids. The invention also relates to the treatment of gas by a transfer water.

The invention can be applied to a great many fields where it is necessary to provide contact, for a minimum fixed duration, between a liquid phase and a gas phase. Notable examples include the operations of disinfection, oxidation, deodorization or decoloration.

Other applications of the invention will also appear easily to those skilled in the art. These applications relate especially to the treatment of waste water: such as water from urban systems or from the food processing, pharmaceutical, chemical and other industries, and also to many industrial manufacturing processes.

The installation of the invention can be used to treat any type of liquid with any type of gas, for example oxygen, chlorine, carbon dioxide or sulphur dioxide. In the same way, it is also possible to treat gases by means of transfer liquids such as, notably, $H_2S$, $NH_3$, $SO_2+$-water.

2. Description of the Prior Art

With respect to installations for disinfection by ozone, there are known disinfection tanks with contactor having ozone diffusion by porous stones. Such installations have many drawbacks, essentially due to the lack of total control over the hydrodynamic motions in the tanks. For, the treatment medium is a two-phase medium, i.e. it is constituted by a emulsion consisting of the liquid to be treated and the treating gas. This emulsion takes the form of bubbles of varying sizes and generates eddy flows.

Problems thus arise. These include problems of the equal division of the flow rates, due to phenomena of heterogeneous flows, eddies, still zones and hydraulic short-circuits in the treated flow, and problems of homogeneity of the concentration in treatment gas.

To provide for the minimum time of contact needed for all the liquid to be treated, it is necessary to maintain a substantial average time of passage in the reactors. This notably calls for oversized structures that are costly and take up a great deal of space.

Furthermore, the installations for gas diffusion by porous stones often display many problems due to the aging of the pores.

The installation of the invention is designed to overcome these different drawbacks of the prior art.

SUMMARY OF THE INVENTION

More precisely, an aim of the invention is to provide a method and an installation for the treatment of a flow of liquid wherein the operation for placing a treatment gas to be depleted into contact with the liquid to be treated is optimized. In other words, the invention is aimed at providing an installation with high efficiency, by achieving control notably over hydrodynamic motions.

A particular aim of the invention is to provide an installation, such as this, that requires a smaller volume and is optimized with respect to civil engineering work.

Another aim of the invention is to provide a treatment installation with a minimized time of passage of the liquid to be treated in the reactors while at the same time meeting the constraints of minimum periods of contacts.

Another aim of the invention is to maximize and homogenize the operation for the treatment of the liquid to be treated, notably in the case of disinfection.

Another aim of the invention is to benefit from the characteristics of presently used installations, in which there is no longer any problem of load loss. For, in present installations, it is the general practice to carry out a double ozonation which requires a repumping operation. It is therefore not a handicap to choose the dimensions of this repumping system so as to accept additional load losses in the treatment chain. The principle underlying the invention is therefore compatible with these requirements. The device of the invention will have the possibility of being integrated into the piezometrical line of an existing installation.

A particular aim of the invention is to provide a device for the forced dissolution of a treatment gas in a liquid to be treated, producing a monophase treatment medium capable, notably, of being implemented in the installation of the invention, but also in many other treatment chains.

In a dual way, another aim of the invention is to provide an installation such as this, designed for the treatment of a gas by a transfer liquid.

These aims, as well as others that shall appear here below, are achieved by means of a method for the treatment of flows of liquids of the type wherein said liquids are put into contact with a treatment gas during a predetermined treatment period, wherein said method comprises the following successive steps of:
  adding said treatment gas to said flow of liquids, so as to obtain a homogeneous gas-liquid emulsion, or two-phase treatment medium;
  depleting the treatment gas contained in said two-phase treatment medium, by forced dissolution of said treatment gas in said flow of liquids, and degassing of said medium of treatment so as to obtain a monophase treatment medium, comprising solely liquids and dissolved treatment gas;
  achieving the plug flow of said monophase treatment medium during said predetermined treatment period.

The treatment of the liquids is thus divided into three distinct successive steps: the addition of the gas to the liquid, the complementary dissolution and degassing, corresponding notably to the starting of the reaction, and the main reaction in the plug flow type of reactor. It is necessary to make a clear distinction and to separate these three phases, notably so that no disturbance interferes with the contact phase.

The term "degassing" implies the separation of the gas and liquid phases and the obtaining of a monophase medium. On the other hand, it does not in any way imply the stripping of the dissolved gas, which would be a result opposite the one desired.

The intermediate step of forced dissolution produces a homogeneous and monophase treatment medium that provides a plug flow in the contactor means, the volume of which may then be reduced as compared with the prior art. For, all the known installations achieve the contact phase on a two-phase treatment medium, thus prompting eddies. The invention provides a solution to a new problem which was never raised in the prior art, namely that of obtaining a monophase treatment medium that generates a plug flow.

The term monophase medium implies a truly monophase medium as well as a quasi-monophase medium, i.e. one that can comprise gas micro-bubbles that do not disturb the plug flow.

The invention also relates to an installation for the treatment of flows of liquids comprising:
means for the addition of the treatment gas to the flow of liquids so as to form a homogeneous two-phase treatment medium;
means for the forced dissolution of said treatment gas in the flow of liquids to be treated cooperating with means for the degassing of said two-phase treatment medium so as to produce a monophase treatment medium;
and contactor means providing for a plug flow of the degassed monophase treatment medium during said predetermined treatment period.

Conversely, the installation of the invention can also be applied to the treatment of a gas by a liquid.

Preferably, said means for the injection 60, FIG. 2 of the treatment gas include at least one static mixer and/or at least one injector, for example of the venturi tube injector type.

Advantageously, said means for the forced dissolution and the degassing are constituted by a recirculator device including two chambers separated by a substantially vertical separation wall, communicating with each other at their lower and upper parts,
said device including:
in its lower part, means for the injection of said two-phase treatment medium into one of the chambers;
in its upper part, means for the recirculation and complementary dissolution of the undissolved treatment gas;
means for the removal of said degassed monophase treatment medium towards said contactor means;
in such a way that said two-phase treatment medium is stirred in a circular flow looped from one chamber to the other.

In this way, the treatment gas is dissolved to the maximum extent, and the mixture is homogeneous.

Preferably, said chambers are constituted by a first central chamber forming a shaft, surrounded by a second annular chamber.

Recirculating devices such as these are already known per se and are described, for example, in the American patent application U.S. Pat. No. 4,072,613 filed on behalf of Alig. However, the role of these known devices is far removed from that of the device of the invention. For, these recirculators are used alone for the ozonation which is therefore done in a two-phase medium. According to the invention, the recirculator is inserted between a mixer and a contactor, and is aimed precisely at converting a gas-liquid emulsion into a monophase medium.

Said separation wall between the chambers advantageously has ports for the crossing of portions of said flow of the treatment medium.

In a preferred embodiment of the invention, at least one of said chambers includes means for the forced recirculation of said two-phase treatment medium in said direction of recirculation and/or dynamic dissolution of said treatment gas in the treatment medium, notably by the pulverizing of the gas bubbles present in the treatment medium.

Advantageously, at least one of said chambers has means for the forced stirring of the upper surface of said two-phase treatment medium so as to prompt the recovery and recirculation of the degassing vents of said device and/or the pulverizing of the treatment gas bubbles.

Said forced recirculation means and/or said stirring means are advantageously constituted by a stirrer blade, driven mechanically or by other means and located in said shaft-forming central chamber.

One or more stirrer blades may also be placed in the annular chamber. The positioning of a stirrer blade notably takes account of the direction of circulation of the flow in the recirculator device, the location of the injection means (for injection into the central shaft or the annular chamber, at the upper or lower level of the recirculator device), and the main purpose of the stirrer blade (to promote the recirculation of the liquid or gas flows, or promote the depletion of the gases, by pulverizing of the gas bubbles, and the homogenization of the mixture).

In a particular embodiment, notably designed to improve the degassing and homogenization, the stirrer blade is driven counter-rotationally with respect to the direction of rotation of the treatment medium. This makes it possible, in particular, to pulverize the gas bubbles that rise towards the surface, and therefore increases the rate of dissolution of the treatment gas.

This recirculator device may also include means for the addition of a reagent 62, FIG. 2 to said flow of liquid to be treated, for example a solid or liquid catalyst, coupled with a physical process, for example of the ultraviolet type.

Preferably, the period of contact of said flow of liquid with said treatment gas in said recirculator device is smaller than 60 seconds.

The removal of the flow of the monophase treated liquid from said recirculator device towards said contactor means can be done notably by means of at least one of the following means indicated generally at reference numeral 63, FIG. 2:
holes,
rings,
sieves,
said removal being done at the bottom of said recirculator device and/or at its vertical wall.

Advantageously, said contactor means include at least one of the following devices:
baffle-plated tank indicated at 65, FIG. 8,
conduits,
system of stacked and/or superimposed parallel conduits.

These contactor means are constituted so as to behave like reactors that are the centers of plug flows.

Preferably, said contactor means include means for the injection of said undissolved treatment gases recovered in said upper part of the recirculator device and/or for the injection of fresh treatment gas, servo-linked to means 66, FIG. 10 for maintaining the quality of water at the end of treatment.

For, it may be useful to add fresh treatment gas, possibly different from the first treatment gas, at this level, the quality of the water having changed at the inlet, and hence at the outlet, of the recirculator device. This approach may also be used when a staged treatment is more advantageous.

These contactor means may notably include at least one substantially vertical dissolution column, in which said liquid flows from top to bottom, said column including, in its upper part, a chamber for the continuous introduction of said treatment gases.

Advantageously, said column also includes a stirrer blade working by suction, driven rotationally in the direction of circulation of said liquid, and possibly locally, a median wall cooperating with said stirrer blade so as to form a recirculation device.

An installation such as this may advantageously include means for the treatment of a predetermined fraction of the total flow of liquid to be treated, said means for the treatment of a fraction of the flow cooperating with means for the on-line mixing 64, FIG. 2, in a turbulent zone, of said fraction of the flow treated with the rest of the flow.

In another advantageous configuration, the installation includes at least two devices comprising means for the addition of treatment gas, means for the forced dissolution and the degassing of said treatment gas and contactor means, connected in parallel on a same conduit of liquid to be treated, and means for the selection of the number of active devices, as a function of the volume of the liquid to be treated.

Said treatment gas may notably belong to the group including ozone, ozonated air, oxygen, sulphur dioxide, carbon dioxide and chlorine.

BRIEF DESCRIPTION OF THE DRAWINGS

Other features and advantages of the invention will appear from the following description of preferred embodiments of the installation according to the invention, presented by way of a non-restrictive illustration, and from the appended drawings, of which:

FIGS. 8 and 9 show two possibilities of the layout of the contactor means with respect to the recirculator device, namely a concentric layout (FIG. 8) and an asymmetrical layout (FIG. 9);

FIG. 10 shows a diagram of the contactor means including means for the reinjection of the gas from the vents recovered in the recirculator device.

MORE DETAILED DESCRIPTION

The invention is therefore aimed at providing a method of treatment achieving contact between the liquid to be treated and the treatment gas in a monophase medium, so as to limit the volume of the installations in providing for a plug flow.

None of the known installations carries out treatment on a monophase medium. More precisely, these installations in no way seek to obtain a plug flow but rather, sometimes, seek to prompt eddies designed to improve the contact. The invention therefore considers the aspect of the contact in a totally novel way, by proposing to work on a monophase medium. This novel approach necessitates the use of a particular method comprising three distinct steps.

Figure 1:
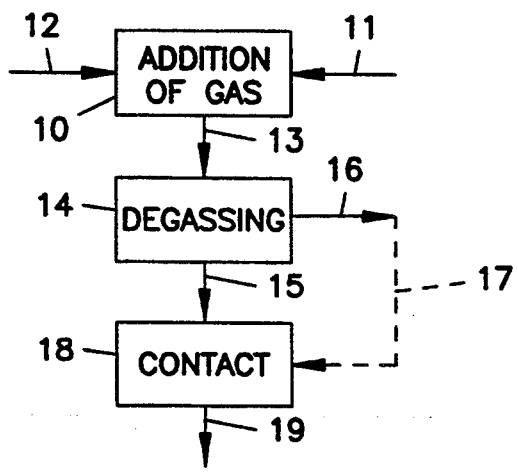
FIG. 1 is a flow chart showing the basic principle of the invention, namely the splitting up of the liquid treatment operation into three steps.

Indeed, the basic principle of the invention consists in carrying out the liquid treatment operation in three steps, as shown in FIG. 1 which presents the method of the invention in the form of a flow-chart.

The treatment of a gas to be treated, for example for a gas washing operation, is done in a similar way.

The first step 10 is a step for the addition of a treatment gas 11 to the liquid to be treated 12, or transfer step. This step leads to the making of a gas/liquid emulsion 13.

The rate of treatment and the concentration of the gas added to the liquid to be treated may be variable as a function of the quality of the liquid to be treated and/or of the desired concentration in gas dissolved in the liquid. The liquid may possibly also receive a prior chemical conditioning upstream of the recirculator.

The second step 14 includes a complementary dissolution and a degassing operation enabling the elimination of the gas during the transfer step 10. This degassing step 14, i.e. notably the recovery from the vents, thus enables the subsequent treatment not of a two-phase medium (gas+liquid), which is a generator of a heterogeneous flow, but of a truly monophase medium 15 (liquid+dissolved gas). The gas from the vents 16 (eliminated gas) may, if necessary, be recovered, confined and reinjected downstream (17).

The last step 18 is a phase for the monophase contact of the liquid with the dissolved gas. In this phase, there may be regulation of the rate of treatment gas as a function of the quality of the treated liquid 19. In addition to the gas from the vents that is recovered and reinjected 17, it is also possible to inject fresh ozone.

As compared with the liquid treatment tanks and, notably, the disinfection tanks of the prior art, it must be noted that the invention physically achieves the separation of the treatment into two indispensable steps (transfer 10 and contact 18). This separation makes it possible to envisage the making of small-sized installations and therefore provides for better control not only over problems related to civil engineering but also over the hydrodynamic movements. Besides, the intermediate degassing phase 14 enables operation under monophase hydraulic conditions during the contact step 18.

It is then far easier to control the flow and, in particular, to approach conditions of plug flow. For, the presence of bubbles in the liquid disturbs the circulation of this liquid. Total control over the flow makes it possible, firstly, to provide for a homogeneous treatment of any liquid and, secondly, to reduce to total period of treatment.

In order to provide for the disinfection of the water by ozone, it is necessary to maintain a minimum concentration of dissolved ozone C during a period of time T. To obtain quality water without having to over-ozonate the water or oversize the tanks, it is therefore necessary to obtain a same contact time T for the entire mass of water and a same minimum concentration C in the entire volume. For standard installations with heterogeneous flow, it has been proposed, for example, to define CT in taking account not of the mean time but of the time $t_{10\%}$ (measured by hydrodynamic plotting) which corresponds to the minimum time of stay of 90% of the water flow-rate. Studies conducted on industrial tanks have shown that $t_{10\%}$ is equal, at best, to 50% of $t_{mean}$. Consequently, the dimensioning based on a value of $t_{10\%}$ that is equal, for example, to four minutes, requires a total dimensioning of the volume for a mean time of at least eight minutes.

Obtaining a plug flow, as aimed at by the invention, makes it possible to avoid oversizing such as this because:

- the smaller sized the reactor, i.e. the shorter the time of stay, the fewer are the chances that the system will be dispersive;
- the more a reactor approaches a "plug flow" type of reactor, the greater is its efficiency, through a gain in dimensioning ($t_{10\%}/t_{mean}$), in efficiency for the 1st or 2nd order kinetics, and in regulation.

Figure 2:
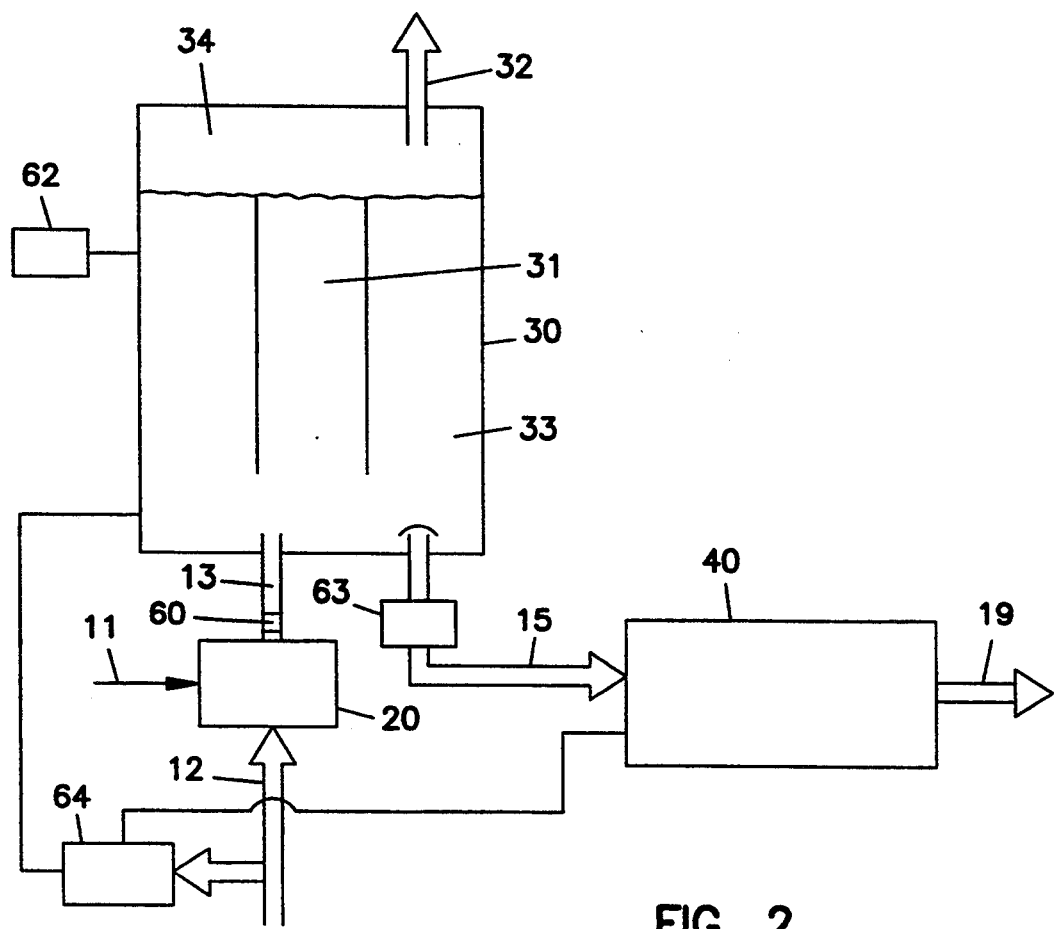
FIG. 2 is the general block diagram of an installation according to the invention, showing the three treatment steps specified in FIG. 1.

The general diagram of an installation for the treatment of liquids or gases according to the principle of the invention is shown in FIG. 2.

In this exemplary embodiment, the liquid to be treated is considered to be water, for example water to be disinfected, and the treatment gas is considered to be ozone or ozonated air. However, it is clear that an installation such as this may be used for any other type of liquid to be treated, irrespectively of the treatment, and with any type of treatment gas ($O_2$, $CO_2$, $Cl_2$, $SO_2$, etc.). It is also possible to envisage an approach where, by adapting the transfer step 10, the reagent is of a solid type (powder, carbon, catalyst etc.) or liquid type (bisulphite, peroxide, oxygenated water etc.).

Broadly speaking, the treatment installation of the invention has three distinct modules:

- a module 20 for the addition of treatment gas 11 to the liquid to be treated;
- a module 30 for the forced dissolution of the treatment gas 11 to the liquid 12;
- a contactor module 40, in which the degassed treatment medium undergoes a plug flow during the fixed treatment period.

The addition module 20, or transferer, achieves a gas-liquid emulsion 13, namely a two-phase mixture that is as homogeneous as possible, comprising the liquid 12 with dissolved gas bubbles.

The emulsion 13 is introduced into the forced dissolution module 30 which is essentially designed to transfer the ozone, or any other treatment gas, into the liquid to be treated, and to give a monophase liquid medium 15 at the outlet of the module 30. It may notably be a recirculator device, comprising a depletion shaft 31, a degassing vent 32 and a forced recirculation annular chamber 32 coaxial to the depletion shaft 31. The recirculation chamber is aimed at providing all the water to be treated with sufficient contact with the ozone, and at dissolving the maximum possible amount of ozone.

The monophase treatment medium 15 is then transmitted to the contactor module 40 which provides for a sufficient water-ozone contact, especially with respect to prevailing standards, and gives the treated liquid 19 at outlet.

The different conduits connecting the modules 20, 30 and 40 may have any cross section. They may be, for example, cylindrical, ovoid, rectangular or trapezoidal.

In the same way, these different modules 20, 30 and 40 may have any cross section.

Here below, a more precise description is given of different embodiments of each of the modules constituting the installation of the invention.

The addition module 20 is preferably of the static mixer type or of the venturi injector type.

The static mixers are devices with a high shear rate, capable of treating all or a part of the volume of water. These known type of devices take the form of a conduit containing a series of fixed stirring blades, with opposite threads, of the Archimedian screw type or any other type of fixed element laid out in a conduit, providing for a division of the current flowing in this conduit and forming a desired hydraulic irregularity.

Thus, the water is stirred during its flow. With respect to the disinfection operations, it is known that the activity of ozone with respect to bacteria increases if the bacteria are not in the form of aggregates. By taking the process to the midst of a very turbulent mixer, the destruction of the aggregates, and hence the vulnerability of the micro-organisms, is furthered. These devices have many other advantages, among them:

- the obtaining of a homogeneous distribution of the gas bubbles;
- intensive mixing in the radial direction, hence total homogenization of the dissolved phase;
- narrow spectrum of the time of stay, generating a plug flow;
- compactness, it being possible for the transfer time to shorter than one second;
- the possibility of causing variation in the flow-rate of treatment gas;
- simplicity of extrapolation by the addition of modules;
- little maintenance;
- the possibility of horizontal or vertical installation;
- lower investment.

The chief drawback of these devices is the load loss that they give rise to.

The venturi type injectors enable the same type of contact as in a static mixer but a priori with a lower load loss. It is possible, notably, to use improved venturi tubes such as those disclosed in the French patent application No. 87 15219 dated Nov. 3, 1987, including a shaft as an extension of the injector of the venturi tube. Preferably, a venturi tube with a descending motive flow is used, so as to combine the emulsion effect with the effect of the column with current of bubbles in the same downward direction.

Advantageously, the addition module 20 may include a static mixer and a venturi injector in series, the injector being placed upstream or downstream of the mixer.

Owing to the space occupied by a transfer module such as this for high flow-rates of liquid, said module may be positioned horizontally, with only its outlet being vertical, an elbow being then positioned between the immediate outlet of the addition module 20 and the inlet on the forced dissolution module 30.

Figure 3:
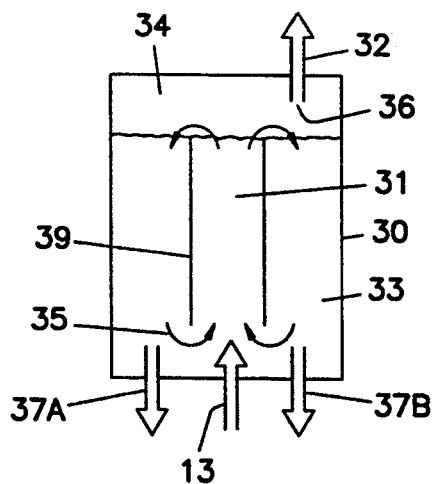
FIGS. 3, 4 and 5 show three possible configurations for the recirculating-degassing device of FIG. 2, in which the position of the removal means (FIGS. 3 and 4) and/or the direction of recirculation of the liquid (FIG. 5) is made to vary.

The emulsion 13 comprising liquid to be treated and treatment gas is then introduced into a forced dissolution module 30. This module 30 may notably be of the recirculator or recirculation column type, as shown in a sectional view in FIGS. 3 and 4, so as to enable the recirculation of the vents and the depletion of the gas.

This recirculating device 30 may have, for example, a cylindrical or parallelepiped shaped section.

This recirculator 30 has a chamber or shaft 31 for the depletion of gases and a forced recirculation annular chamber 31 coaxial with the depletion shaft 31. The two chambers 31 and 33 are separated by a wall 39, and communicate with each other at their lower part 34 and upper part 35, so as to enable the recirculation of the medium of treatment in the recirculator. This device 30 is aimed at dissolving the largest possible amount of treatment gas in the liquid to be treated and at homogenizing the treatment medium. It also enables the elimination of the gas bubbles, and hence the production of a monophase medium facilitating the plug flow and averting problems of gas embolism or flotation on the downstream filters.

Advantageously, the gas from the vents 36, or undissolved gas, may be recovered (32) and reinjected into the contactor 40. This makes it possible, notably, to regulate the pressure within the recirculator 30. It is also possible to reinject these recovered gases 32 directly into the recirculator 30.

Figure 4:
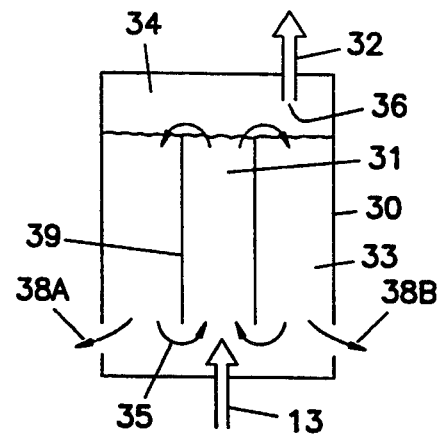

The removal of the monophase treatment medium can be done at the bottom ($37_A$, $37_B$) of the recirculator or, as shown in FIG. 4, on the external vertical wall ($38_A$, $38_B$) of the recirculator. This removal may notably be done by means of holes, rings and/or sieves.

Figure 5:
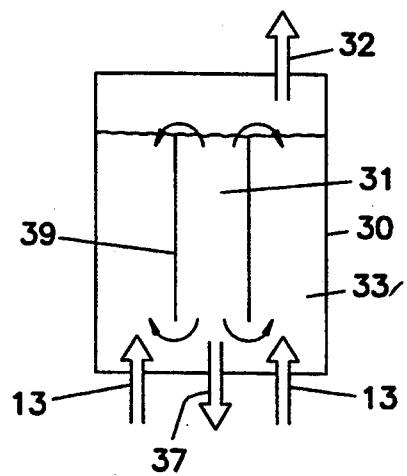

FIG. 5 shows an alternative embodiment of a recirculator in which the injection of the emulsion 13 is done at the ring. In this case, the direction of the recirculation goes from the annular chamber 32 to the central shaft 31. To homogenize the flows, it is then possible to place several injectors 20 on the ring. The removal 37 of the monophase treatment medium will then be done at the center of the bottom of the recirculator.

In another embodiment, it is also possible to achieve the injection of the gas-liquid emulsion 13 through the upper part of the recirculator, either in a central position or at the ring.

So as to improve the quality of the mixing and of the recirculation, the wall 39 is advantageously drilled with ports 61, FIGS. 8 and 9, or constituted by several sections, forming small recirculation cells.

Figure 6:
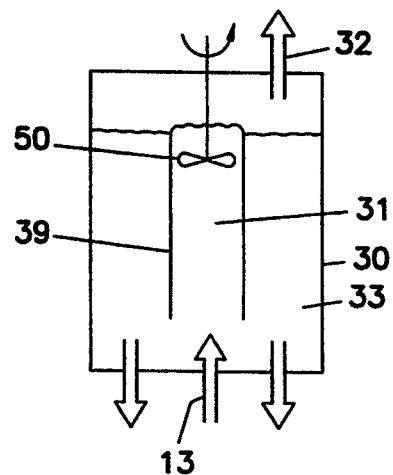
FIG. 6 is a drawing of a recirculator device fitted out with a turbine, so as to improve the recirculation and dissolution of the treatment gases.

Advantageously, the recirculator may be fitted out with means for the forced recirculation of the treatment medium, as shown in FIG. 6. A driven stirrer blade 50 or a turbine, placed in the central shaft 31 in the direction of the movement provides for an improved circulation of the treatment medium. It also makes it possible to improve the dissolution of the treatment gas by breaking the gas bubbles, i.e. by reducing their size, and improving their recirculation. Forced recirculation means may also be placed in the annular chamber 33.

Preferably, the stirrer blade 50 will be placed so as to ensure a shaking of the upper part of the treatment medium, enabling a recovery of gas from the vents, and hence an increase in the rate of dissolved gas. This result may also be obtained by means for shaking the surface, that do not disturb the recirculation, for example means such as beaters.

The stirrer blade 50, or a turbine, may also be placed in a position of opposition to the direction of recirculation so as to improve the quality of the mixing.

The speed of rotation of the stirrer blade or of the turbine is advantageously related to the hydraulic conditions. More precisely, the position and speed of rotation of the turbine will be fixed as a function of the compromise energy cost and efficiency of suction.

With the turbine positioned, it is possible to take action on the rotation speed so as to achieve conditions of suction of the gas ceiling thus enabling the recovery of gas from the vents.

These means, designed to force the recirculation of the treatment medium, increase the rate of dissolution and promote the recovery of the gases from the vents, may clearly be combined in one and the same recirculator. Their position in the recirculator may vary, notably as a function of the position of the injection means 20 and of the removal means.

In a particular embodiment of the invention, the recirculator also includes means for the addition of one or more reagents to the treatment medium, for example of the catalyst type.

They may notably be solid or liquid catalysts, such as oxygenated water. The addition of a catalyst is advantageously coupled with a physical method, for example of the ultraviolet type.

Figure 7:
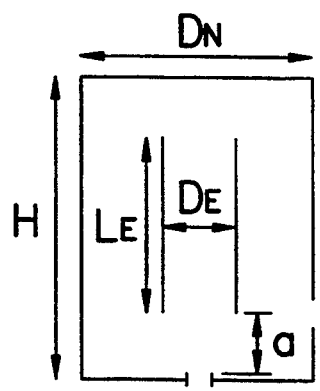
FIG. 7 gives orders of magnitude of the dimensioning of a recirculator of the invention, by way of a particular exemplary embodiment.

FIG. 7 gives orders of magnitude of an example of the dimensioning of a recirculator 30. Advantageously, the dimensions of the recirculator are chosen so as to approach the following ratios (with the following notations: H : height of recirculation; V : total volume; $D_N$ : diameter of the recirculator: $D_E$: diameter of the central shaft; $L_E$: height of the wall of the central shaft; a: spacing between the bottom of the central shaft and the end of the injector):

$D_E/D_N \in [0.5; 0.6]$ $H/D_N \in [4; 5.5]$ $L_E/D_E \in [6. 7.5]$ $a/D_E \approx 0.1$ Thus, for an installation having to treat 10 m³/h, the recirculator could have the following dimensions:

H = 1 m

V = 28 l $D_N$ = 0.19 m $D_E$ = 0.1 m $L_E$ = 0.65 m a = 0.01 m

For an installation treating between 1300 and 1500 m³/h, the recirculator will have a height H of about 4 m, for a diameter $D_N$ of the order of 1 m.

Installation such as this enable a contact time in the recirculation of the order of T=15s. Generally, it is desirable for the contact time to be less than one minute.

A recirculating/degassing device 30 such as this clearly has many applications in other industrial processes requiting a mixing of a gas and a liquid in one and the same liquid phase.

After the dissolution of the treatment gas, the monophase treatment medium 15 is directed towards the contactor means 40 which ensure a minimum time of contact between the liquid to be treated and the dissolved treatment gas. As has been specified here above, the obtaining of a monophase medium makes it possible to achieve a plug flow, and hence to reduce the contact time of the treatment medium and, as a corollary, the civil engineering work required.

The contactor means 40 may be baffle-plated tanks as shown in FIGS. 8 and 9. These tanks have a set of partition walls 41A, 41B, 41C, 41D which, by means of apertures $42_A$, $42_B$, $42_C$, $42_D$, define alternately in an upper and lower position, an enforced path for the entire flow of liquid. The time taken to travel on this path corresponds to the imposed contact time. Since the flow is a plug flow, each molecule of liquid has an identical contact time corresponding, for example, to the minimum time laid down by the standards.

The contactor means 40 are positioned either concentrically (FIG. 8) about the recirculator device 30 or asymmetrically (FIG. 9) or, again, symmetrically or in any other way, taking account notably of the space factor constraints.

It is also possible to use a single conduit as the contactor 40, or a system of stacked or superimposed conduits in parallel. It is then necessary to work in turbulent mode, so as to obtain a flat speed curve. Furthermore, it will be sought to avoid elbows as far as possible. A configuration such as this has the advantage of requiring only a small investment.

The gas from the vents 36, recovered during the forced dissolution operation 14, may be reinjected into the treatment medium. FIG. 10 is a diagram of contactor means including means 43 for the reinjection of gas from the vents. It is also possible to reinject fresh treatment gas 44, namely gas that has not been already used, so as to optimize the quality of the water and/or if the staged treatment is more advantageous.

In this case, the contactor means are separated into at least two tanks $40_A$ and $40_B$ (or conduits or series of conduits) and an injection device is laid out between the tanks $40_A$ and $40_B$. This injection device is of the porous stone or surface aerator tupe, such as a beater. This injection may be done either at the floor or at the ceiling.

To avoid dispersing the flow, it is sought to preserve a medium that is, to the utmost extent possible, a monophase medium. The reinjection is therefore done in a volume corresponding to a low contact time. The contact time in this volume will not be taken into account for the computation of CT so that only the time of passage in the plug flow contactor is considered as the time of stay.

If porous stones are used, a low-volume compartment will be used, characterized geometrically so as to have neither bubbles nor micro-bubbles (flotation) downstream. The volume of this compartment will correspond, for example, to a time of passage of the order of 30 seconds.

FIG. 8 includes an (optional) injection device of the surface aerator type. The injection is done in the column 54, wherein the liquid to be treated circulates from top to bottom. The treatment gas 53 is introduced continuously into the upper part of this column, and is sucked into the liquid to be treated.

So as to further this suction, forced suction means, such as a stirrer blade 51, driven in the direction of circulation of the liquid, may be added. As has been explained here above with reference to FIG. 6, a stirrer blade such as this, by causing the shaking of the treatment medium, furthers the recovery of gas from the vents and hence the dissolution of the treatment gas.

It is also possible to make a recirculator device enabling the rate of dissolution to be further increased. Thus a median wall 52 may be placed concentrically within the column 54, on at least a part of the length of this column. In this case, the movement of the stirrer blade prompts a recirculation of a part of the liquid to be treated, within the chamber defined by the wall 52, towards the annular chamber constituted by this wall and the column 54. Other configurations of a recirculator device such as this may be envisaged (arrangements of one or more stirrer blades in the central chamber or annular chamber, apertures in the wall 52 etc.) as has already been shown for the main recirculator 30 of the invention with reference to FIGS. 3 to 6.

Advantageously, the quantity of reinjected gas 53 will be a function of the quality of the water at the end of treatment and/or of the desired concentration in dissolved gas. To this end, the injector 43 is controlled by means 45 for regulating the quantity of gas.

The gas may be reinjected in one or more steps. Thus, gases 53 may be reinjected by means of two successive injectors, interposed between tanks or conduits. This configuration makes it possible to reduce the concentration of gas at the inlet of the injector 43 and to obtain a high energy efficiency, notably when the quality of the liquid to be treated is good and substantially constant.

In one installation according to the invention, it is possible to use a set of several devices, each including injection, recirculation and contact means, connected in parallel on a same conduit for the supply of liquid to be treated. This layout gives an obvious gain in space. Besides, it is easier to make several small-sized devices than only one very large device. These devices may furthermore be manufactured in a single model for several different sites. The treatment capacity of each site will then depend on the number of devices used.

Several configurations may be envisaged. In particular, these devices may be parallel-connected or cascade-connected.

Another essential advantage of this configuration lies in the possibility of selecting the number of devices to be used as a function of the total water flow-rate in the conduit at each instant. Thus, in each device, the operation will be done at a nominal water flow-rate, thus preventing the risk of laminar flows when a contactor receives an excessively low flow-rate of water.

Furthermore, an excessively low flow-rate would prevent the recirculation of gas bubbles in the recirculator. For, in a mixture comprising bubbles and water, the recirculation is easier for the liquid than for the gas bubbles.

It is also possible for an installation such as this to treat only a fraction of the total flow to be treated, the fraction being tapped by a bypass. After treatment, the treated medium is then mixed with the rest of the flow by means of on-line mixing in a turbulent zone. The value of the treated fraction lay be variable, and may be chosen as a function of the quality of the water to be treated or of the quality of treatment desired.

What is claimed is:

1. An installation for the treatment of a flow of liquids, comprising:
    means for the addition of the treatment gas to the flow of liquids so as to form a homogeneous two-phase treatment medium;
    means for the forced dissolution of said treatment gas in the flow of liquids to be treated cooperating with means for the degassing of said two-phase treatment medium so as to produce a monophase treatment medium;

and contactor means providing for a plug flow of the degassed monophase treatment medium during a predetermined treatment period, wherein said means for the forced dissolution and the degassing are constituted by a recirculator device including two chambers separated by a substantially vertical separation wall and communicating with each other at their lower and upper parts, said device including:

in its lower part, means for the upward injection of said two-phase treatment medium into one of the chambers;

in its upper part, means for the recirculation and complementary dissolution of undissolved treatment gas and means for degassing the two-phase treatment medium in the other of said two chambers;

means for the removal of said degassed monophase treatment medium in the lower part of the other of said two chambers and for introducing said degassed monophase treatment medium into said contactor means, in such a way that said two-phase treatment medium is stirred in an upwardly circular flow looped from the one chamber to the other.

2. An installation according to claim 1, wherein said chambers are constituted by a first central chamber forming a shaft, surrounded by a second annular chamber.

3. An installation according to either of the claim 2, wherein the recirculation means is constituted by a stirrer blade, driven mechanically and located in said shaft-forming central chamber.

4. An installation according to claim 3, including means for driving counter-rotationally said stirrer blade with respect to direction of rotation of the treatment medium.

5. An installation according to either of the claim 1, wherein said separation wall between the chambers has ports for the crossing of portions of said flow of the treatment medium.

6. An installation according to claim 1, wherein at least one of said chambers includes means for the forced recirculation of said two-phase treatment medium in said direction of recirculation and/or dynamic dissolution of said treatment gas in the treatment medium.

7. An installation according to claim 1, wherein at least one of said chambers has means for the forced stirring of the upper surface of said two-phase treatment medium so as to prompt the recovery and recirculation of degassing vents of said device and/or the pulverizing of treatment gas bubbles.

* * * * *

UNITED STATES PATENT AND TRADEMARK OFFICE
CERTIFICATE OF CORRECTION

PATENT NO. : 5,399,261
DATED : March 21, 1995
INVENTOR(S) : Nathalie Martin; Michel Faivre; Marie-Marguerite Bourbigot; Christian Laplace It is certified that error appears in the above-identified patent and that said Letters Patent is hereby corrected as shown below:

On title page,

Item (75), Inventors, after the word "Garches", insert --Christian Laplace, Colombes,--.

Column 11, line 3, delete "41A, 41B, 41C, 41D" and insert therefor --$41_A$, $41_B$, $41_C$, $41_D$--.

Column 11, line 35, delete "tupe" and insert therefor --type--.

Column 12, line 54, delete "lay" and insert therefor --may--.

Column 14, line 11, after the word "to", delete --either of the--.

Column 14, line 3, after the word "to", delete --either of the--.

Signed and Sealed this

Twenty-sixth Day of March, 1996

Attest:

BRUCE LEHMAN

*Attesting Officer*  *Commissioner of Patents and Trademarks*